(12) United States Patent
Ou et al.

(10) Patent No.: US 11,242,923 B2
(45) Date of Patent: Feb. 8, 2022

(54) DRIVING FORCE TRANSMISSION APPARATUS

(71) Applicants: JATCO Ltd, Fuji (JP); NISSAN MOTOR CO., LTD., Yokohama (JP)

(72) Inventors: Tou Ou, Musashino (JP); Toshiyuki Fujii, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/963,901

(22) PCT Filed: Dec. 20, 2018

(86) PCT No.: PCT/JP2018/046896
§ 371 (c)(1),
(2) Date: Jul. 22, 2020

(87) PCT Pub. No.: WO2019/146324
PCT Pub. Date: Aug. 1, 2019

(65) Prior Publication Data
US 2021/0041015 A1 Feb. 11, 2021

(30) Foreign Application Priority Data
Jan. 25, 2018 (JP) .............................. JP2018-010760

(51) Int. Cl.
*F16H 57/035* (2012.01)
*F16H 57/04* (2010.01)
*F16H 9/18* (2006.01)

(52) U.S. Cl.
CPC ....... *F16H 57/035* (2013.01); *F16H 57/0421* (2013.01); *F16H 57/0471* (2013.01); *F16H 9/18* (2013.01)

(58) Field of Classification Search
CPC ............... F16H 57/035; F16H 57/0421; F16H 57/0471; F16H 57/0424
See application file for complete search history.

(56) References Cited

U.S. PATENT DOCUMENTS

2010/0242669 A1 9/2010 Komizo
2011/0244999 A1 10/2011 Nakamura

FOREIGN PATENT DOCUMENTS

| JP | H08303560 A | * | 11/1996 | ......... F16H 57/0421 |
| JP | 2000046158 A | * | 2/2000 | ........... F16H 57/043 |
| JP | 2010-236581 A | | 10/2010 | |

(Continued)

*Primary Examiner* — Thomas C Diaz
(74) *Attorney, Agent, or Firm* — Foley & Lardner LLP

(57) ABSTRACT

A continuously variable transmission includes a case member including an outer surface on the side where a torque converter is disposed and an inner surface on the side where a driving force transmission mechanism is disposed. The case member includes a supporting hole by which a bearing that supports a third shaft is supported, a supporting hole by which a bearing that supports a fourth shaft is supported, and an oil path through which an lubricant, to be supplied to the bearing and the bearing, is supplied. The oil path protrudes from the outer surface from the case member and has a straight line shape connecting between the supporting hole and the supporting hole. Thus, components can be appropriately lubricated even when it is difficult to provide lubrication pipes.

3 Claims, 6 Drawing Sheets

(56) References Cited

FOREIGN PATENT DOCUMENTS

| | | | |
|---|---|---|---|
| JP | 2011-208796 A | 10/2011 | |
| JP | 2013-177958 A | 9/2013 | |
| JP | 2017-057880 A | 3/2017 | |
| KR | 20160115711 A | * 10/2016 | ........... F16H 57/035 |

* cited by examiner

DRIVING FORCE TRANSMISSION APPARATUS

TECHNICAL FIELD

The present invention relates to a driving force transmission apparatus.

BACKGROUND ART

Patent Document 1 discloses a configuration in which an oil path is provided to a connection case portion (housing) to which a torque converter is connected from the outer side.

Patent document 2 discloses a configuration in which a lubrication pipe is provided as a method of lubricating components of a continuously variable transmission.

Based on the configurations disclosed in Patent Documents 1 and 2, various components may be lubricated by connecting the oil path of the housing and the lubrication pipe. However, an area around the housing may have components, such as gears, densely arranged, meaning that the provision of the lubrication pipe may render the layout difficult.

FIGS. 5A, 5B and FIGS. 6A, 6B are diagrams illustrating a case member 80 (housing) according to a conventional example. FIG. 5A is a plan view of the case member 80 as viewed from the side cover (not illustrated). FIG. 5B is an enlarged view of the main part of the case member 80 as illustrated in FIG. 5A.

FIG. 6A is a plan view of the case member 80 as viewed from the housing (converter cover). FIG. 6B is an enlarged view of the main part of the case member 80 as FIG. 6A.

In FIGS. 5A, 5B and FIGS. 6A, 6B, an end surface on the viewer side in the drawing sheet is hatched for the sake of description.

A continuously variable transmission for a vehicle includes a plurality of rotation transmission shafts (first shaft, second shaft, third shaft, fourth shaft) that are arranged in parallel with each other.

As illustrated in FIG. 5A, the case member 80, which is a component of a transmission case, is provided with supporting holes 81, 82, 83, and 84 for the rotation transmission shafts (first shaft, second shaft, third shaft, fourth shaft).

Of the supporting holes 81, 82, 83, and 84, the supporting holes 81 and 84 are through holes and the remaining supporting holes 82 and 83 are bottomed supporting holes.

To a circumference wall portion 851 surrounding a region including the supporting holes 81, 82, 83, and 84, a side cover (not illustrated) is assembled from the viewer side in the drawing sheet and is fixed thereto using a bolt (not illustrated).

The side cover (not illustrated) also includes supporting holes supporting the plurality of rotation transmission shafts, and one end and the other end in the longitudinal direction of each of the plurality of rotation transmission shaft are rotatably supported respectively by the case member 80 and the side cover (not illustrated).

A supply hole 861 for a lubricant OL is open inside the circumference wall portion 851 and outside an arched wall 820 surrounding the supporting hole 82.

Into this supply hole 861, the lubricant OL from an oil pressure control circuit (not illustrated) included in the continuously variable transmission is supplied.

The supporting hole 82 is formed to be recessed toward the farther side from the viewer in the drawing sheet, and has a bottom wall 821 provided with an oil path 86 (see FIG. 5B) in communication with the supply hole 861.

In the case member 80, the oil path 86 is provided in a wall portion 85 partitioning the region on the side of the side cover (the viewer side in the drawing sheet) and the region on the side of the housing (the side farther from the viewer in the drawing sheet).

The oil path 86 is linearly provided along a straight line L1 connecting between an axis X2 of the second shaft and an axis X3 of the third shaft.

In the region of the supporting hole 82, the oil path 86 is provided to cross the axis X2 of the second shaft in the radial direction. A region of the oil path 86 positioned in the supporting hole 82 bulges toward the viewer side in the drawing sheet from the bottom wall 821 of the supporting hole 82.

Thus, the region of the oil path 86 that bulges toward the viewer side in the drawing sheet functions as a rib for increasing the rigidity and strength of the case member 80.

At a position of the oil path 86 intersecting with the axis X2, a cylindrical supporting tube 825 is provided. One end of the second shaft 2 is rotatably supported by this supporting tube 825.

The supporting tube 825 is in communication with the oil path 86, and a part of the lubricant OL flowing in the oil path 86 is supplied into an oil path in the second shaft (not illustrated) from the supporting tube 825.

A bearing (not illustrated) supporting one end of the second shaft in the supporting hole 82 is lubricated with the lubricant OL supplied from the supporting tube 825.

A ring shaped supporting portion 830 surrounding the supporting hole 83 is provided at a position adjacent to the supporting hole 82. At a position of the supporting portion 830 intersecting with the axis X3 on the inner side, a cylindrical supporting tube 835 is provided. One end of the third shaft is rotatably supported by this supporting tube 835.

The supporting tube 835 is in communication with the oil path 86, and a part of the lubricant OL flowing in the oil path 86 is supplied into an oil path in the third shaft from the supporting tube 835.

A bearing (not illustrated) supporting one end of the third shaft in the supporting hole 83 is lubricated by the lubricant OL supplied from the supporting tube 835.

In the supporting hole 83, an oil path 832 is provided on a straight line L1 connecting between the axis X2 and the axis X3 and at a position in contact with the inner circumference of the supporting portion 830.

The oil path 832 is also in communication with the oil path 86, and a part of the lubricant OL flowing in the oil path 86 is supplied into the supporting hole 83 from the oil path 832.

One end 89a of a guide pipe 89 (lubrication pipe) for the lubricant is attached to a position of the oil path 86 close to the outer circumference of the supporting portion 830 from the viewer side in the drawing sheet.

In plan view, the guide pipe 89 includes a straight line portion 891 linearly extending downward toward the supporting hole 84, and a bend portion 892.

The bend portion 892 is bent to be in a shape circumventing the outer circumference of a differential case (not illustrated) rotatably supported by the supporting hole 84. An oil hole 89c is provided in a portion of the bent portion 892 facing the supporting hole 84. The oil hole 89c faces the differential case (not illustrated) rotatably supported by the supporting hole 84.

Thus, a part of the lubricant OL flowed into the guide pipe 89 from the oil path 86 described above is ejected toward the outer circumference of the differential case (not illustrated) through the oil hole 89c.

The differential case (not illustrated) is rotatably supported by the cylindrical supporting portion 840 surrounding the supporting hole 84 via a bearing (not illustrated).

The supporting portion 840 is in communication with the oil path 841 extending downward toward the circumference wall portion 851 in the wall portion 85. The oil path 841 is open toward the viewer side in the drawing sheet at a lower portion of the supporting portion 840, with the other end 89b of the guide pipe 89 attached to the oil path 841 from the viewer side in the drawing sheet.

Thus, a part of the lubricant OL flowed into the guide pipe 89 from the oil path 86 described above is supplied to the supporting portion 840 through the oil path 841 to lubricate the bearing supported on the inner side of the supporting portion 840.

In a region of the case member 80 inside the circumference wall portion 851, components such as gears are densely arranged. Thus, depending on the specification of the case member 80, the guide pipe (lubrication pipe) may be difficult to provide.

Thus, there is a demand for enabling appropriate lubrication of various components, even when the lubrication pipe is difficult to provide.

PRIOR ART DOCUMENTS

Patent Document

Patent Document 1: JP2010-236581A
Patent Document 2: JP2011-208796A

SUMMARY OF INVENTION

An aspect of the present invention provides a driving force transmission apparatus including a case member including an outer surface on side where a torque converter is disposed and an inner surface on side where a driving force transmission mechanism is disposed. The case member includes a first supporting portion by which a first bearing is supported; a second supporting portion by which a second bearing is supported; and a first lubricant path through which a lubricant, to be supplied to the first bearing and the second bearing, is supplied, and the first lubricant path protrudes from the outer surface and has a shape connecting between the first supporting portion and the second supporting portion.

With the aspect of the present invention, the case lubrication path is formed on the outer side of the case member instead of the pipe, whereby limitation on the gear layout on the inner side is relaxed. Thus, the components can be appropriately lubricated even when it is difficult to provide lubrication pipes.

Furthermore, with the shape protruding from the outer surface and connecting between the first supporting portion and the second supporting portion, a function as a reinforcement rib against the stress produced between the first supporting portion and the second supporting portion can be additionally provided.

DESCRIPTION OF EMBODIMENTS

An embodiment of the present invention will be described below with a case where a driving force transmission apparatus is a belt continuously variable transmission 5 as an example.

Figure 1:
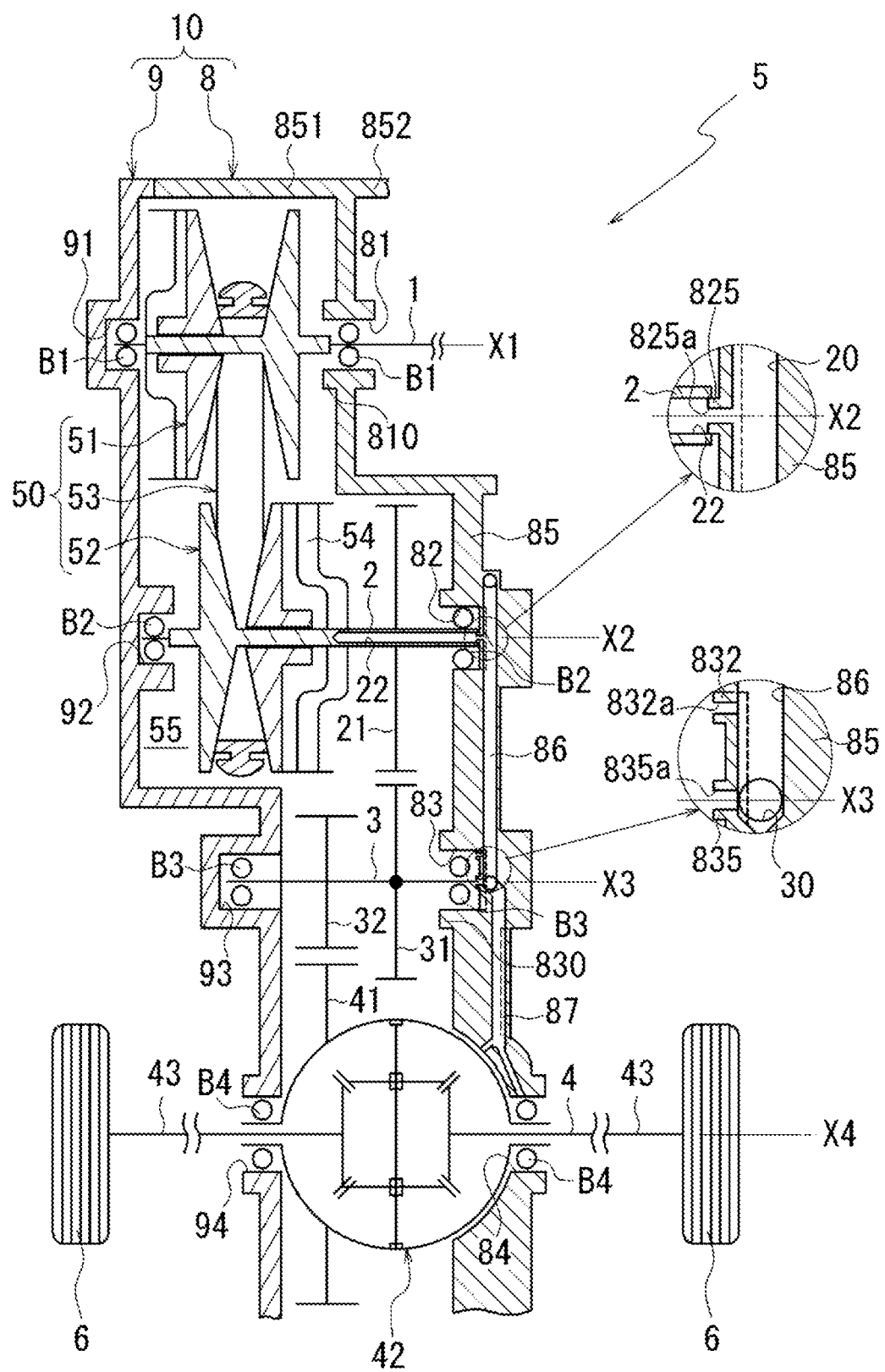
FIG. 1 is a diagram illustrating a schematic configuration of a continuously variable transmission.

FIG. 1 is a diagram illustrating a schematic configuration of a continuously variable transmission 5.

FIG. 1 schematically illustrates a transmission path of rotational driving force in the continuously variable transmission 5 in a range between a variator 50 and driving wheels 6.

Figure 2A:
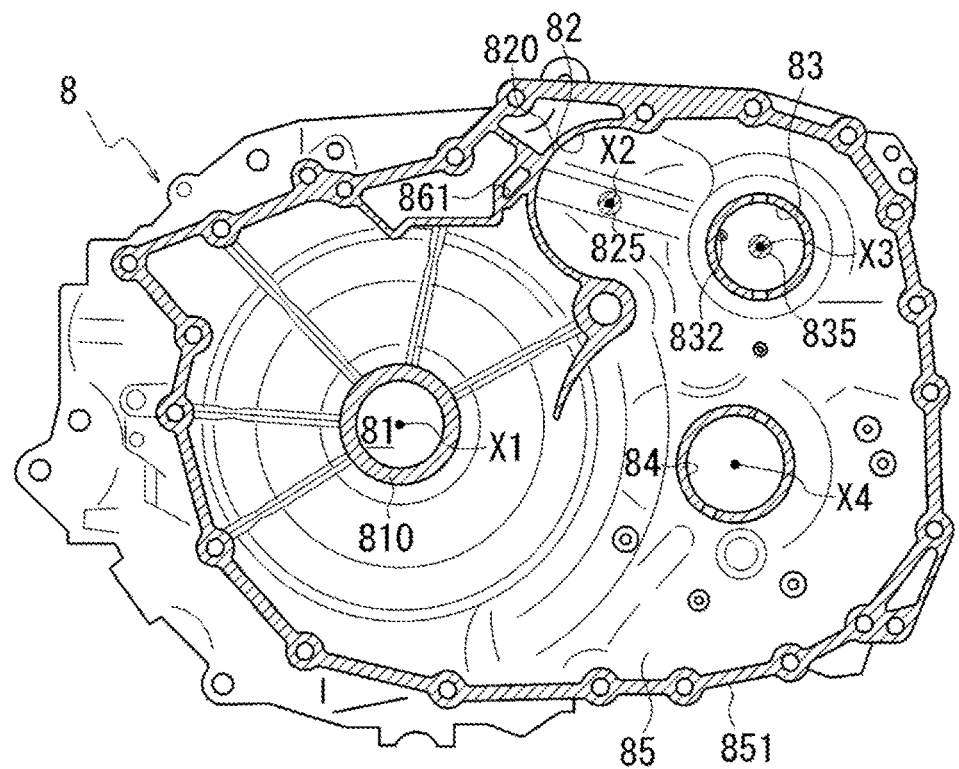
FIGS. 2A and 2B are diagrams illustrating a case member.
Figure 2B:
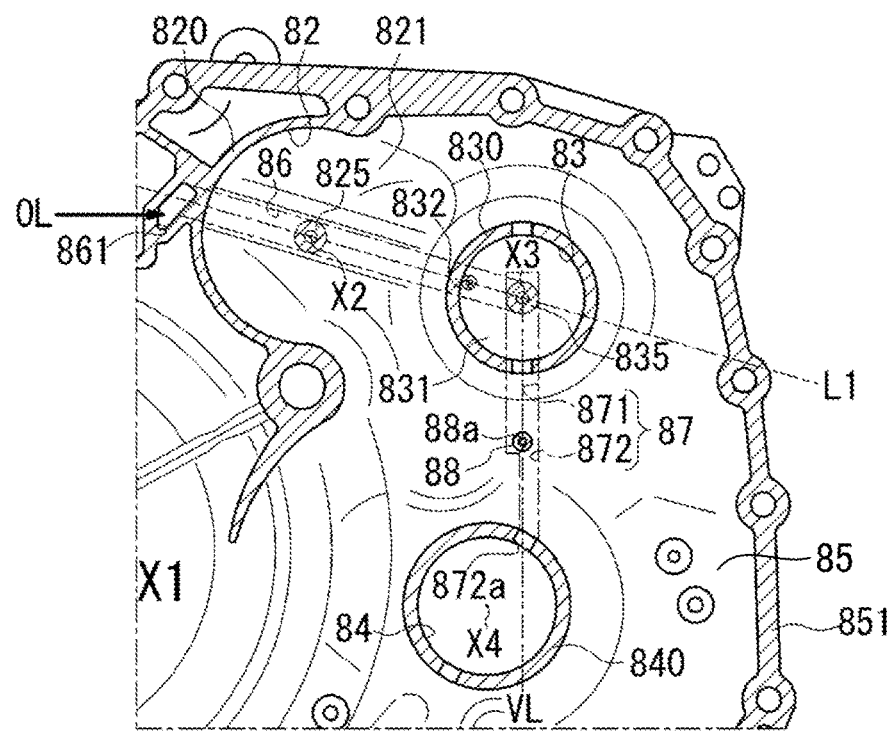

FIGS. 2A and 2B are diagrams illustrating an inner surface of a case member 8 as viewed from a side cover 9. FIG. 2A is a plan view of the case member 8 as viewed from the side cover 9, and FIG. 2B is an enlarged view of the main part of the FIG. 2A.

Figure 3A:
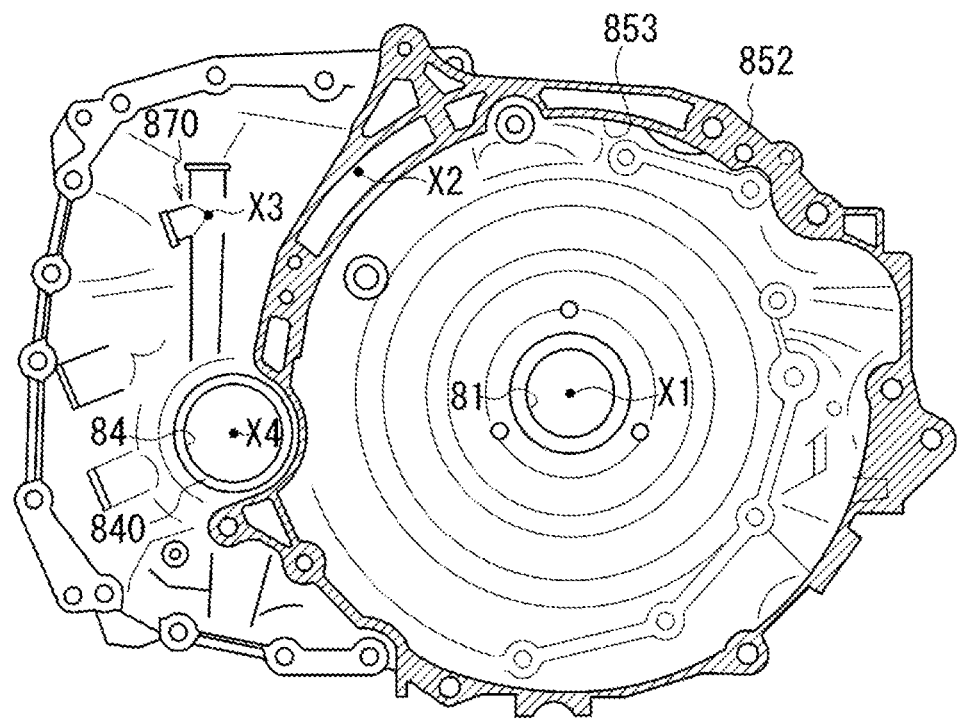
FIGS. 3A and 3B are diagrams illustrating the case member.
Figure 3B:
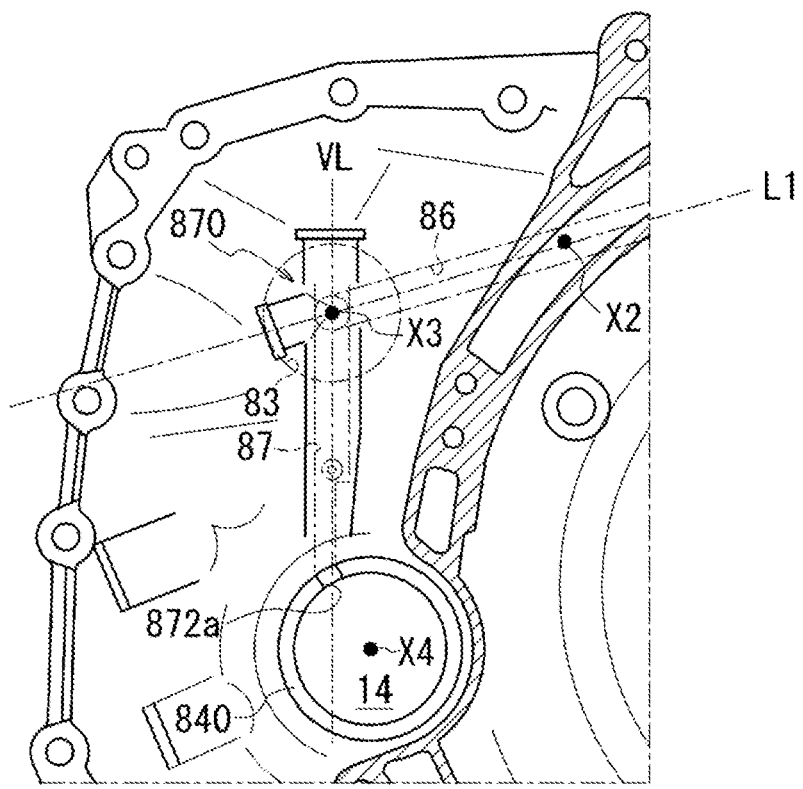

FIGS. 3A and 3B are diagrams illustrating an outer surface of the case member 8. FIG. 3A is a plan view of the case member 8 as viewed from the housing (opposite side to the side cover 9). FIG. 3B is an enlarged view of the main part of the FIG. 3A.

In a transmission case 10 of the belt continuously variable transmission 5, a plurality of rotation transmission shafts (a first shaft 1, a second shaft 2, a third shaft 3, and a fourth shaft 4) are rotatably supported while being arranged in parallel with each other.

As illustrated in FIG. 1, the case member 8, which is a component of the transmission case 10, is provided with supporting holes 81, 82, 83, and 84 for the rotation transmission shafts (the first shaft 1, the second shaft 2, the third shaft 3, and the fourth shaft 4).

Of the supporting holes 81, 82, 83, and 84, the supporting holes 81 and 84 are through holes formed through a wall portion 85, and the remaining supporting holes 82 and 83 are bottomed supporting holes.

The side cover 9, which is a component of the transmission case 10, is also provided with supporting hole 91, 92, 93, and 94 for the rotation transmission shafts (the first shaft 1, the second shaft 2, the third shaft 3, and the fourth shaft 4).

The rotation transmission shafts (the first shaft 1, the second shaft 2, the third shaft 3, and the fourth shaft 4) are rotatably supported by the side cover 9 and the case member 8 via bearings B1, B2, B3, and B4.

As illustrated in FIG. 2A, the case member 8 includes a circumference wall portion 851 surrounding a region including the supporting holes 81, 82, 83, and 84.

The side cover 9 (see FIG. 1) is assembled to the circumference wall portion 851 from the viewer side in the drawing sheet and is fixed thereto using a bolt (not illustrated).

As illustrated in FIG. 1, the case member 8 is provided with a tubular supporting wall 810 defining the supporting hole 81.

The bearing B1 is supported on the inner circumference of the supporting wall 810, and the region of the first shaft 1 positioned within the supporting hole 81 is rotatably supported by the supporting wall 810 via the bearing B1.

A space in the transmission case 10 defined between the case member 8 and the side cover 9 serves as a container chamber 55 for a driving force transmission mechanism.

A region of the first shaft 1 positioned within the container chamber 55 is provided with a primary pulley 51 of the variator 50.

The second shaft 2 is rotatably supported by the supporting hole 82 of the case member 8 and the supporting hole 92 of the side cover 9.

A region of the second shaft 2 positioned within the container chamber 55 is provided with a secondary pulley 52 of the variator 50.

A region of the second shaft 2 positioned within the supporting hole 82 is rotatably supported by the inner circumference of the supporting hole 82 via the bearing B2.

A belt 53 is wound around the outer circumferences of the primary pulley 51 and the secondary pulley 52. The variator 50 is formed by the primary pulley 51, the secondary pulley 52, and the belt 53.

Rotational driving force from a driving source not illustrated is input to the first shaft 1. The rotational driving force input to the first shaft 1 is transmitted to the second shaft 2 via the primary pulley 51, the belt 53, and the secondary pulley 52.

In the variator 50, when the winding radius of the belt 53 on the primary pulley 51 and the secondary pulley 52 changes, the rotational driving force input to the first shaft 1 is changed on the basis of the speed ratio depending on the winding radius, and the resultant rotational driving force is transmitted to the second shaft 2.

A region of the second shaft 2 positioned inside the case member 8 is provided with a gear 21 in an integrally rotatable manner. The gear 21 is in mesh with a counter gear 31 of the third shaft 3 in a rotation transmittable manner.

The rotational driving force transmitted to the second shaft 2 is transmitted to the third shaft 3 via the counter gear 31 in mesh with the gear 21, to make the third shaft 3 rotate about an axis X3.

The third shaft 3 has one end in a longitudinal direction inserted into the supporting hole 83 of the case member 8 in the direction along the axis X3. The one end of the third shaft 3 is rotatably supported by a bottomed supporting portion 830, surrounding the supporting hole 83, via the bearing B3.

The one end of the third shaft 3 is provided with a gear 32 in an integrally rotatable manner. The gear 32 is in mesh with a final gear 41, fixed to the outer circumference of a differential 42, in a rotation transmittable manner.

The rotational driving force transmitted to the third shaft 3 is transmitted to a differential 42 via the final gear 41 in mesh with the gear 32.

As a result, the differential 42 and axle shafts 43, coupled to this differential 42, rotate about an axis X4. Thus, the driving wheels 6 and 6, to which the axle shafts 43 are coupled, rotate on the basis of the rotational driving force thus transmitted.

In the present embodiment, the rotation center axes of the first shaft 1, the second shaft 2, the third shaft 3, and the fourth shaft 4 respectively correspond to the axes X1, X2, X3, and X4.

As illustrated in FIGS. 2A and 2B, a supply hole 861 for a lubricant OL is open inside the circumference wall portion 851 of the case member 8 and outside an arched wall 820 surrounding the supporting hole 82.

The supply hole 861 is in communication with an oil path formed in the side cover 9, when the side cover 9 is assembled to the case member 8.

The oil path in the side cover 9 is in communication with an oil pressure control circuit (not illustrated) of the continuously variable transmission, whereby the lubricant OL from the oil pressure control circuit (not illustrated) is supplied into this supply hole 861.

As illustrated in FIG. 2B, the supporting hole 82 is formed to be recessed toward the further side from the viewer in the drawing sheet, and has a bottom wall 821 provided with an oil path 86 in communication with the supply hole 861.

In the case member 8, the oil path 86 is provided in a wall portion 85 partitioning the region on the side of the side cover (the viewer side in the drawing sheet) and the region on the side of the housing (the side farther from the viewer in the drawing sheet).

The oil path 86 is linearly provided along a straight line L1 connecting between the axis X2 of the second shaft and the axis X3 of the third shaft.

In the region of the supporting hole 82, the oil path 86 is provided to cross the axis X2 in the radial direction. In a region of the oil path 86 positioned in the supporting hole 82, a material (portion) of the wall portion 85 surrounding the oil path 86 bulges toward the viewer side in the drawing sheet from the bottom wall 821 of the supporting hole 82.

Thus, in the region where the material (portion) of the wall portion 85 surrounding the oil path 86 bulges toward the viewer side in the drawing sheet, the material (portion) of the wall portion 85 surrounding the oil path 86 functions as a rib for increasing the rigidity and strength of the case member 8.

At a position of the oil path 86 intersecting with the axis X2, a cylindrical supporting tube 825 is provided. As illustrated in FIG. 1, one end of the second shaft 2 is rotatably supported by this supporting tube 825.

The supporting tube 825 is in communication with the oil path 86, and a part of the lubricant OL flowing in the oil path 86 is supplied into the oil path 22 in the second shaft 2 through an ejection port 825a of the supporting tube 825.

The lubricant OL supplied into the oil path 22 is supplied to a centrifugal oil pressure cancel chamber 54 for the secondary pulley 52.

Furthermore, a part of the lubricant OL supplied from the supporting tube 825 leaks into the supporting hole 82 through a gap between the outer circumference of the supporting tube 825 and the inner circumference of the oil path 22 of the second shaft 2.

With this lubricant OL thus leaked, the bearing B2 (see FIG. 1) supporting one end of the second shaft 2 in the supporting hole 82 is lubricated.

As illustrated in FIG. 2B, a substantially ring shaped supporting portion 830 surrounding the supporting hole 83 is provided at a position adjacent to the supporting hole 82. At a position of the supporting portion 830 intersecting with the axis X3 on the inner side, a cylindrical supporting tube 835 is provided. One end of the third shaft 3 is rotatably supported by this supporting tube 835.

The supporting tube 835 is in communication with the oil path 86, and a part of the lubricant OL flowing in the oil path 86 is supplied into an oil path (not illustrated) in the third shaft 3 through an ejection port 835a of the supporting tube 835.

The bearing B3 (see FIG. 1) supporting one end of the third shaft 3 in the supporting hole 83 is lubricated by a part of the lubricant OL supplied from the supporting tube 835.

An oil path 832 including an ejection port 832a for the lubricant OL is provided at a position in the vicinity of the inner circumference of the supporting portion 830 in the oil path 86. The ejection port 832a of the oil path 832 is open on one side of the bearing B2 (see FIG. 1) in the direction along the axis X2.

In the present embodiment, a part of the lubricant OL flowing in the oil path 86 is supplied into the supporting hole 83 through the ejection port 832a of the oil path 832. Thus, the bearing B3 (see FIG. 1) in the supporting portion 830 and the third shaft 3 rotatably supported by the supporting portion 830 are lubricated by the lubricant OL thus supplied.

As illustrated in FIG. 2B, in a region of the oil path 86 that overlaps with the supporting portion 830, the other oil path 87 provided in the wall portion 85 crosses the oil path 86.

The oil path 87 is provided along a vertical line VL passing through the axis X3 of the third shaft 3, in a vertical line direction based on the installed state of the continuously variable transmission 5.

In a region of the supporting hole 83, the oil path 87 is provided to cross the axis X3 in the radial direction. The region of the oil path 87 positioned in the supporting hole 83 bulges toward the farther side from the viewer in the drawing sheet from a bottom wall 831 of the supporting hole 83.

Thus, the region of the oil path 87 bulging toward the farther side from the viewer in the drawing sheet functions as a rib for increasing the rigidity and strength of the case member 8.

Figure 4A:
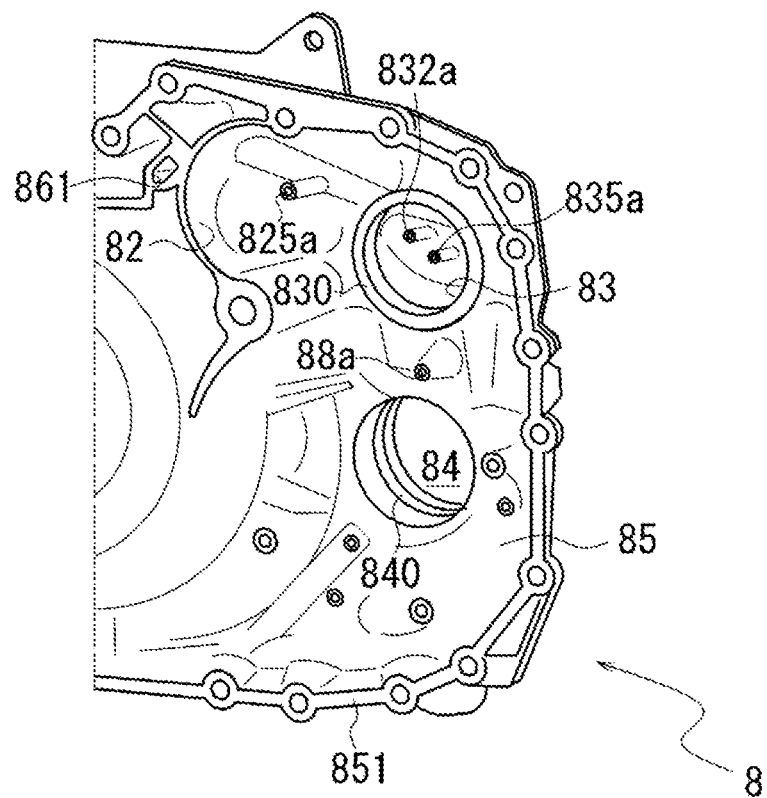
FIGS. 4A and 4B are schematic views illustrating an arrangement of oil paths in the case member.
Figure 4B:
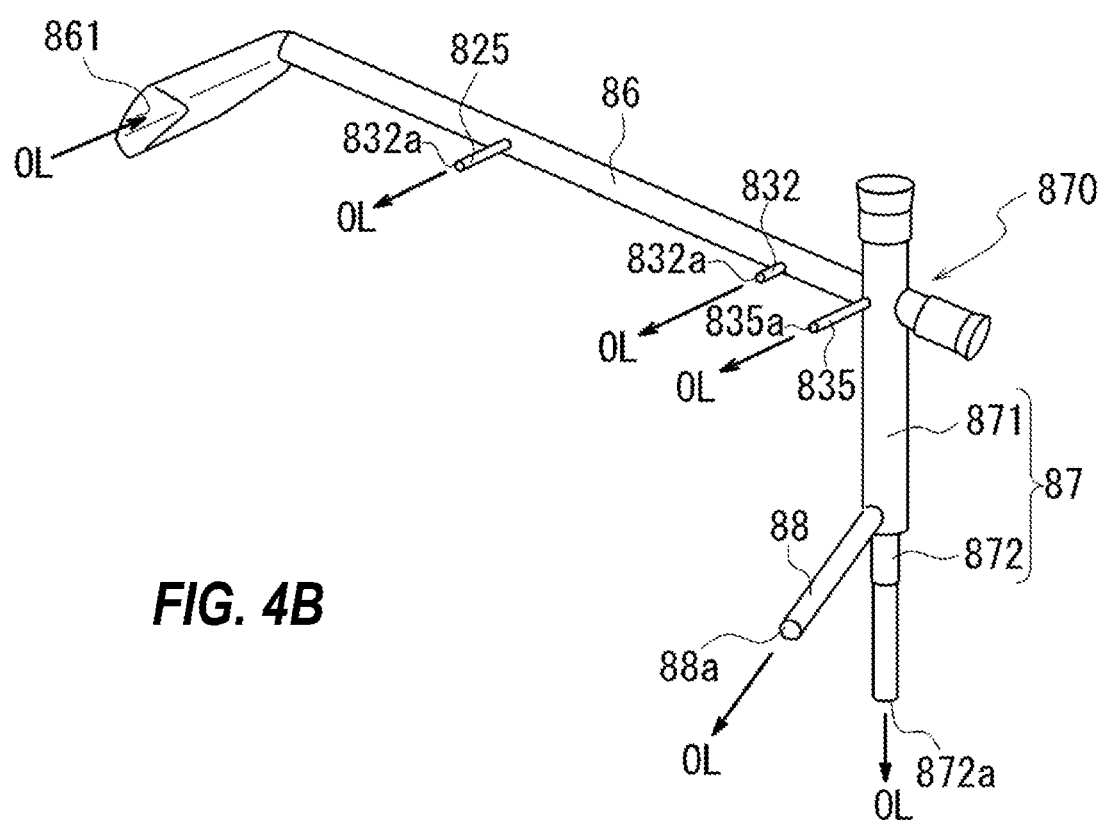
Figure 5A:
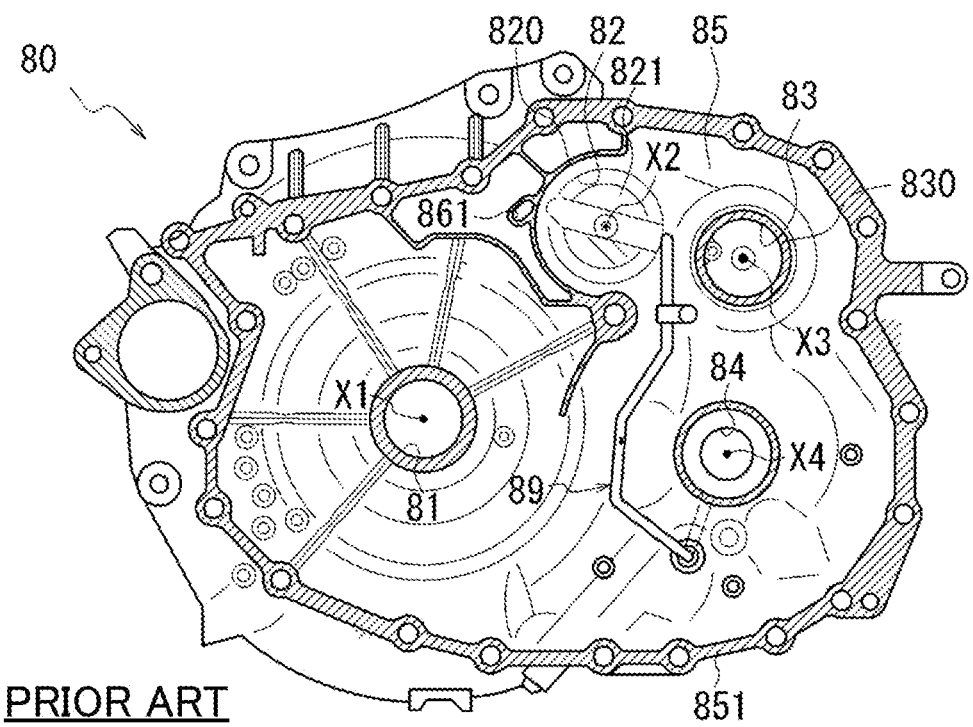
FIGS. 5A and 5B are diagrams illustrating a case member according to a conventional example.
Figure 5B:
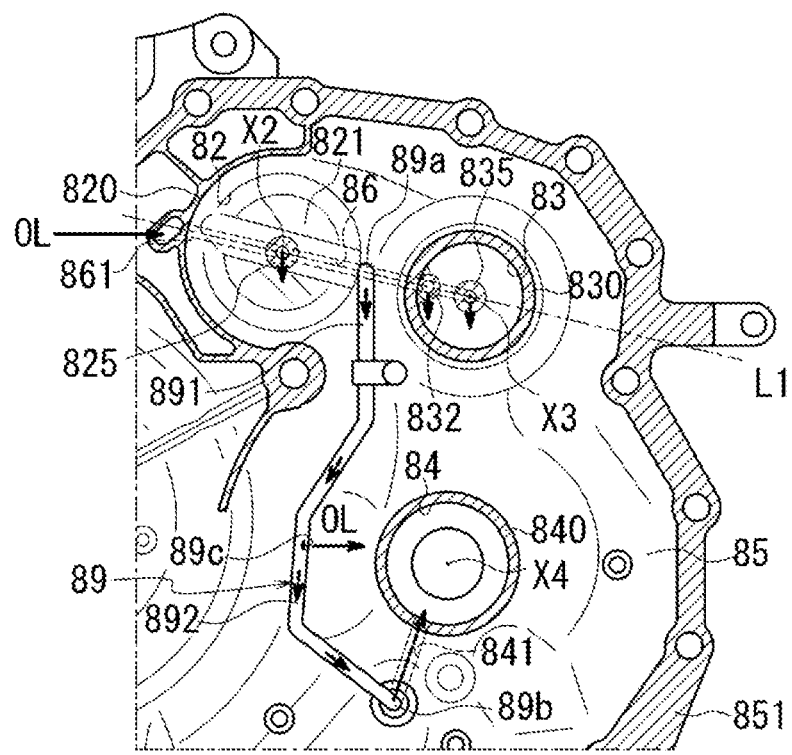

FIGS. 4A and 4B are schematic views illustrating an arrangement of the oil paths 86 and 87 in the case member 8. FIG. 4A is an enlarged perspective view of the region of the case member 8 provided with the oil paths 86 and 87. FIG. 4B is a partial schematic view of the oil paths 86 and 87 in the case member 8.

As illustrated in FIG. 4B and FIG. 2B, the oil path 87 includes a large diameter portion 871 on the side of the oil path 86, and a small diameter portion 872 extending downward toward the axis X4 from the large diameter portion 871.

An ejection port 872a at the distal end of the small diameter portion 872 opens in the inner circumference of the supporting portion 840 surrounding the supporting hole 84 of the fourth shaft 4.

The oil path 87 is an oil path in a shape of a straight line connecting between the supporting portion 830 (supporting hole 83) and the supporting portion 840 (supporting hole 84) with the shortest distance therebetween.

An oil path 88 is connected to a portion of the large diameter portion 871 at the boundary with the small diameter portion 872.

In FIG. 2B, the oil path 88 protrudes toward the viewer side in the drawing sheet, and an ejection port 88a at the distal end of the oil path 88 opens in a region of the wall portion 85 between the supporting portion 830 and the supporting portion 840.

In this state, the ejection port 88a of the oil path 88 is provided to face the outer circumference of a differential case (not illustrated) rotatably supported by the supporting hole 84.

In a region of the wall portion 85 provided with the oil path 87, the material (portion) of the wall portion 85 surrounding the oil path 87 bulges toward the housing (farther side from the viewer in the drawing sheet in FIG. 2B).

As illustrated in FIGS. 3A and 3B, the case member 8 is provided with a circumference wall portion 852 as viewed from the housing (not illustrated). The inner side of the circumference wall portion 852 serves as a container portion 853 for a torque converter, and the circumference wall portion 852 is formed to be a substantially annular shape surrounding the axis X1.

The supporting hole 84 is open at a portion on the outer side of the circumference wall portion 852. The ejection port 872a of the oil path 87 described above is open in the inner circumference of the supporting portion 840 surrounding the supporting hole 84.

The oil path 87 linearly extends upward from the ejection port 872a along the vertical line VL, and crosses the oil path 86 on the axis X3 of the third shaft 3 described above.

In the wall portion 85 of the case member 8, the region provided with the oil path 87 (a region between the supporting portion 840 of the supporting hole 84 and a connection portion 870 between the oil path 86 and the oil path 87) bulges toward the housing.

Thus, in the case member 8, the material (portion) of the wall portion 85 surrounding the oil path 87 functions as a reinforcement rib.

As described above, in the case member 8, the material (portion) of the wall portion 85 surrounding the oil path 86 crossing the oil path 87 bulges toward the farther side from the viewer in the drawing sheet in FIG. 3B.

Thus, in the case member 8, the region of the oil path 86 in FIG. 4B bulges toward the side cover 9, and the region of the oil path 87 bulges toward the side opposite to the side cover 9 (housing side).

Thus, in the case member 8 as viewed from the housing as illustrated in FIG. 3B, the region outside the circumference wall portion 852 has a material (portion) that surrounds the oil path 87 and bulges toward the viewer side in the drawing sheet, and a material (portion) that surrounds the oil path 86 and bulging toward the farther side from the viewer in the drawing sheet. The materials (portions) extend in different directions in the direction along the axis X3.

Thus, the material (portion) that surrounds the oil path 87 and bulges toward the viewer side in the drawing sheet, and the material (portion) that surrounds the oil path 86 and bulges toward the farther side from the viewer in the drawing sheet function as reinforcement ribs that can even further increase the rigidity and strength of the case member 8.

Thus, in the case member 8, the rigidity and strength are required in a range from the second shaft (axis X2) to the fourth shaft (axis X4) via the third shaft (axis X3).

Figure 6A:
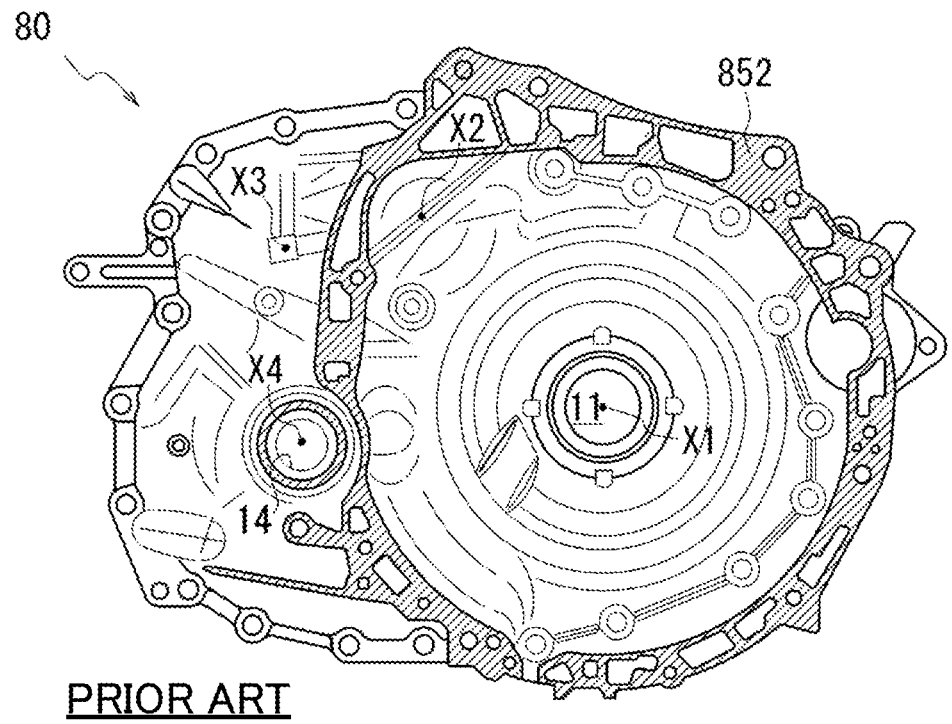
FIGS. 6A and 6B are diagrams illustrating the case member according to the conventional example.
Figure 6B:
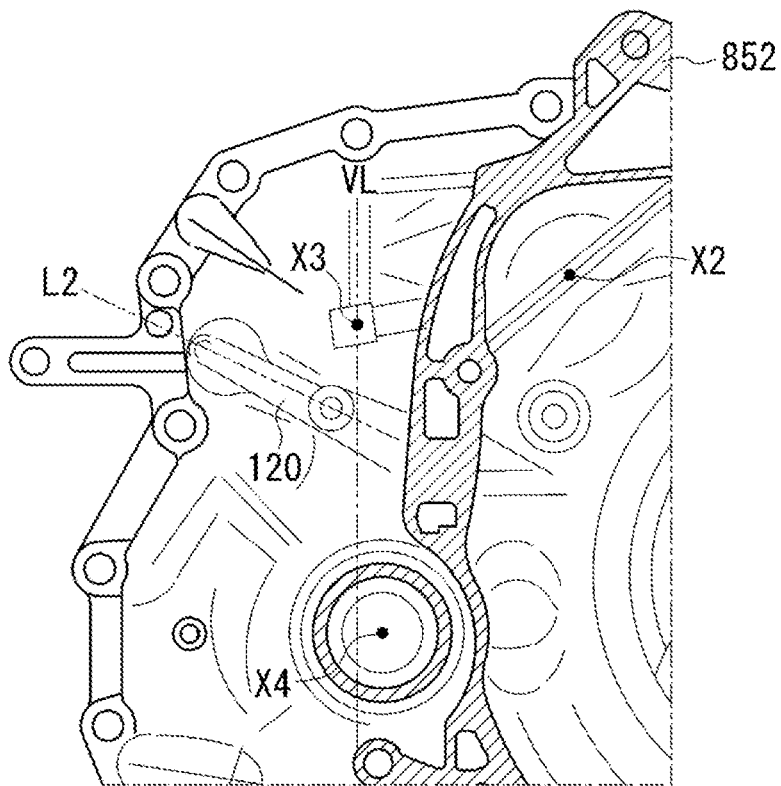

On the other hand, in the case member 80 according to the conventional example, a rib 120 is provided across the vertical line VL passing through the axis X3 as illustrated in FIG. 6B.

This rib 120 is formed by separately providing a region bulging toward the viewer side in the drawing sheet, on the wall portion 85.

In the case of the continuously variable transmission according to the conventional example, stress in a direction along the straight line L2 in the figure acts between the third shaft (axis X3) and the fourth shaft (axis X4) during the operation of the continuously variable transmission.

Thus, the continuously variable transmission according to the conventional example has the rib 120 for reinforcing the rigidity and strength, provided along the straight line L2 in the range from the second shaft (axis X2) to the fourth shaft (axis X4) via the third shaft (axis X3).

Thus, required rigidity and strength are guaranteed with the rib 120 provided to cross the vertical line VL passing through the axis X3 in the case member 80.

On the other hand, in the case member 8 according to the present embodiment, the region provided with the oil path 87 bulges toward the viewer side in the drawing sheet, in the case member 8 as viewed from the housing (see FIG. 3B).

This region provided with the oil path 87 is positioned outside the circumference wall portion 852 surrounding the container portion 853 for a torque converter, and the oil path 87 linearly extends in the radial direction with respect to the axis X4 from the supporting portion 840 surrounding the supporting hole 84.

As illustrated in FIG. 3B, the surface of the wall portion 85 facing the housing is provided with a thick portion (rib) that surrounds the oil path 87, and the thick portion (rib) surrounding the oil path 87 is formed between the region of the supporting portion 840 serving as the supporting portion of the fourth shaft 4 and the region of supporting hole 83 serving as the supporting portion for the third shaft 3.

Thus, this thick portion surrounding the oil path increases the rigidity and strength of the region of the wall portion 85 between the third shaft 3 and the fourth shaft 4.

Furthermore, in the wall portion 85, the thick portion (rib) surrounding the oil path 86 is formed to bulge toward the side cover. This thick portion (rib) surrounding the oil path 86 is formed between the region of the supporting hole 82 serving as the supporting portion that supports the second shaft 2 and the region of the supporting hole 83 serving as the supporting portion that supports the third shaft 3. This increases the rigidity and strength of the region of the wall portion 85 between the third shaft 3 and the fourth shaft 4.

In the present embodiment, the thick portion (rib) surrounding the oil path 86 and the thick portion (rib) surrounding the oil path 87 bulge in different directions in the direction along the axis X4 from the wall portion 85. Thus, in the wall portion 85, the rigidity and strength of the region from the second shaft 2 to the fourth shaft 4 via the third shaft 3 are increased with the oil paths 86 and 87 provided.

Thus, the rib 120 (see FIG. 6B) required in the case member 80 according to the conventional example can be omitted.

As described above, the continuously variable transmission (automatic transmission) according to the present embodiment includes the following configuration.

(1) The continuously variable transmission 5 (driving force transmission apparatus) includes the case member 8 including an outer surface on the side where a torque converter is disposed and an inner surface on the side where a driving force transmission mechanism is disposed.

The case member 8 includes the supporting hole 83 (first supporting portion) by which the bearing B3 (first bearing) that supports the third shaft 3 is supported, a supporting hole 84 (second supporting portion) by which the bearing B4 (second bearing) that supports the fourth shaft 4 is supported, and an oil path 87 (first lubricant path) through which the lubricant OL, to be supplied to the bearing B3 and the bearing B4, is supplied.

The oil path 87 protrudes from the outer surface of the case member 8 and has a straight line shape connecting between the supporting hole 83 and the supporting hole 84.

The oil path 87 (first lubricant path) is a pipe-shaped oil path connecting between the supporting hole 83 (first supporting portion) and the supporting hole 84 (second supporting portion).

The oil path 87 protruding from the outer surface of the case member 8 is formed instead of the guide pipe 89 used in the case member 80 according to the conventional example. Thus, the portion of the case member 8 surrounding the oil path 87 does not protrude from the inner surface of the case member 8.

Thus, the limitation of the layout of gears forming the driving force transmission mechanism disposed inside the inner surface of the case member 8 is relaxed.

Furthermore, the oil path 87 connecting between the supporting hole 83 and the supporting hole 84 is formed with a portion of the case member 8 surrounding the oil path 87 protruding from the outer surface. Thus, a function as a reinforcement rib against stress produced between the supporting hole 83 and the supporting hole 84 during the operation of the continuously variable transmission 5 can be additionally provided.

Furthermore, with the guide pipe 89 omitted, the manufacturing cost for the case member 8 can be reduced.

In particular, the oil path 87 is formed as an oil path in a shape of a straight line connecting between the supporting hole 83 and the supporting hole 84 with the shortest distance, whereby an oil path resistance can be made small.

The continuously variable transmission (automatic transmission) according to the present embodiment includes the following configuration.

(2) The oil path 86 (second lubricant path) connecting between the oil path 87 (first lubricant path) and the supply hole 861 (lubricant reception portion) is provided.

To the supply hole 861, the lubricant is transferred from the transmission case 10 (case main body portion) containing the driving force transmission mechanism (variator 50, differential 42).

The oil path 86 includes the oil path 832 including the ejection port 832a (lubricant ejection hole) through which the lubricant OL is ejected toward the driving force transmission mechanism.

The oil path 832 including the ejection port 832a protrudes from the inner circumference side of the case member 8.

The lubrication effect may be compromised under a vehicle condition involving an insufficient lubricant amount, when oil is ejected toward the driving force transmission mechanism at a position slightly separated from the inner circumference surface of the case member 8.

In view of this, the oil path 832 including the ejection port 832a through which the lubricant OL is ejected toward the driving force transmission mechanism is different from the oil path 87 in that it protrudes toward the inner side to be disposed at a position closed to the driving force transmission mechanism.

With this configuration, the driving force transmission mechanism can be appropriately lubricated even under a vehicle condition involving an insufficient lubricate amount.

The continuously variable transmission (automatic transmission) according to the present embodiment includes the following configuration.

(3) The lubricant OL ejected through the ejection port 825a (lubricant ejection hole) is supplied to the centrifugal oil pressure cancel chamber 54 for the belt continuously variable transmission 5.

With this configuration, a part of the lubricant OL supplied to the centrifugal oil pressure cancel chamber 54 for the continuously variable transmission 5 can flow into the oil path 87, so that the differential 42 and the like forming the driving force transmission mechanism can be appropriately lubricated.

The continuously variable transmission (automatic transmission) according to the present embodiment includes the following configuration.

(4) The bearing B3 (first bearing) supports the third shaft 3 to which driving force is transmitted from an output shaft of the driving force transmission mechanism.

The bearing B4 (second bearing) supports the fourth shaft 4 to which driving force is transmitted from the third shaft 3.

The fourth shaft 4 is a shaft connected to the driving wheel 6.

With this configuration, the bearing B3 supporting the third shaft 3 and the bearing B4 supporting the fourth shaft 4 can be supplied with the lubricant OL to be appropriately lubricated.

In the above embodiment, the case where the driving force transmission apparatus is an automatic transmission for a vehicle is described as an example. The driving force transmission apparatus according to the invention of the present application is not limited to the automatic transmission for a vehicle only.

The invention can be applied to an apparatus with a configuration in which in a gear train including a plurality of gears, at least one of the gears scrapes up the oil inside a case containing the gear train. An example of such an apparatus includes a decelerator that outputs a result of decelerating input rotation.

In the embodiment described above, the case where the oil path 87 is formed to be in a shape of a line, specifically, a shape of a straight line connecting between the supporting hole 83 and the supporting hole 84 is described as an example.

The shape of the oil path 87 is not limited to that illustrated in the embodiment, and can be changed as appropriate depending on the shape and the like of the region of the wall portion 85 provided with the oil path 87 and a region thereonaround.

Specifically, a shape of a curved line, an inflected line with a plurality of points of inflection, or a bent line with a plurality of bending points, connecting between the supporting hole 83 and the supporting hole 84 may be employed.

While the embodiment of the present invention has been described above, the present invention is not limited to aspects shown in the embodiment. Changes and modifications can be made appropriately within the scope of the technical ideas of the present invention.

The present application claims a priority of Japanese Patent Application No. 2018-10760 filed with the Japan Patent Office on Jan. 25, 2018 all the contents of which are hereby incorporated by reference.

What is claimed is:

1. A driving force transmission apparatus comprising a case member including an outer surface on side where a torque converter is disposed and an inner surface on side where a driving force transmission mechanism is disposed, wherein the case member includes:
    a first supporting portion by which a first bearing is supported;
    a second supporting portion by which a second bearing is supported; and
    a first lubricant path through which a lubricant, to be supplied to the first bearing and the second bearing, is supplied, and
the first lubricant path protrudes from the outer surface and has a shape connecting between the first supporting portion and the second supporting portion,
the driving force transmission apparatus further comprises a second lubricant path connecting between the first lubricant path and a lubricant reception portion to which the lubricant is transferred from a case main body portion containing the driving force transmission mechanism,
the second lubricant path includes a lubricant ejection hole through which the lubricant is ejected toward the driving force transmission mechanism, and
the second lubricant path protrudes from the inner surface.

2. The driving force transmission apparatus according to claim 1, wherein through the lubricant ejection hole, the lubricant is supplied to a centrifugal oil pressure cancel chamber in a belt continuously variable transmission.

3. The driving force transmission apparatus according to claim 1, wherein
    the first bearing supports a first shaft to which driving force is transmitted from an output shaft of the driving force transmission mechanism, and
    the second bearing supports a second shaft to which driving force is transmitted from the first shaft.

* * * * *